US011330693B2

(12) United States Patent
Hultermans et al.

(10) Patent No.: US 11,330,693 B2
(45) Date of Patent: May 10, 2022

(54) ILLUMINATION CONTROL

(71) Applicant: SIGNIFY HOLDING B.V., Eindhoven (NL)

(72) Inventors: Martijn Marius Hultermans, Eindhoven (NL); Edith Danielle Den Hartog, Eindhoven (NL); Peter Tjin Sjoe Kong Tsang, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 246 days.

(21) Appl. No.: 16/305,148

(22) PCT Filed: May 17, 2017

(86) PCT No.: PCT/EP2017/061843
§ 371 (c)(1),
(2) Date: Nov. 28, 2018

(87) PCT Pub. No.: WO2017/207276
PCT Pub. Date: Dec. 7, 2017

(65) Prior Publication Data
US 2020/0323065 A1 Oct. 8, 2020

(30) Foreign Application Priority Data
May 30, 2016 (EP) .................................. 16171935

(51) Int. Cl.
*H05B 47/18* (2020.01)
*H05B 47/19* (2020.01)
*H05B 47/105* (2020.01)
*H05B 47/11* (2020.01)
*H05B 47/115* (2020.01)

(52) U.S. Cl.
CPC ........... *H05B 47/18* (2020.01); *H05B 47/105* (2020.01); *H05B 47/11* (2020.01); *H05B 47/115* (2020.01); *H05B 47/19* (2020.01)

(58) Field of Classification Search
CPC ....... H05B 47/18; H05B 47/19; H05B 47/105
See application file for complete search history.

(56) References Cited

U.S. PATENT DOCUMENTS

| 6,545,586 B1 * | 4/2003 | Belliveau .............. H04L 12/403 340/2.1 |
| 9,125,274 B1 | 9/2015 | Brunault et al. |
| 2010/0296285 A1 * | 11/2010 | Chemel .................. H05B 47/12 362/235 |

(Continued)

FOREIGN PATENT DOCUMENTS

| WO | 02101702 A2 | 12/2002 |
| WO | 2006131860 A1 | 12/2006 |

(Continued)

*Primary Examiner* — Alexander H Taningco
*Assistant Examiner* — Pedro C Fernandez (57) ABSTRACT

A method and apparatus for modifying a dynamic lighting effect, where that effect is considered or deemed unfavourable, by obtaining information of the dynamic lighting effect for at least part of a an area illuminated by said effect; determining, based on the obtained information, a modifying lighting pattern to modify the effect of said dynamic lighting, and controlling one or more luminaires to output the modifying lighting pattern selectively to a target portion of the illuminated area.

12 Claims, 5 Drawing Sheets

(56) References Cited

U.S. PATENT DOCUMENTS

| | | | | |
|---|---|---|---|---|
| 2013/0027934 A1* | 1/2013 | Velazquez | ............ | F21V 23/009 362/249.01 |
| 2013/0221858 A1* | 8/2013 | Silberstein | ............ | H05B 47/19 315/153 |
| 2014/0232298 A1 | 8/2014 | Gillies et al. | | |
| 2014/0252987 A1* | 9/2014 | Hinrichs | ................ | H05B 45/20 315/297 |
| 2015/0061502 A1 | 3/2015 | Rains, Jr. et al. | | |
| 2015/0271899 A1* | 9/2015 | Bosua | .................... | H05B 45/20 315/294 |

FOREIGN PATENT DOCUMENTS

| | | | |
|---|---|---|---|
| WO | 2012137046 | A1 | 10/2012 |
| WO | 2014013376 | A1 | 1/2014 |
| WO | 2015000628 | A1 | 1/2015 |
| WO | 2015063640 | A1 | 5/2015 |
| WO | 2016023754 | A1 | 2/2016 |

\* cited by examiner

ILLUMINATION CONTROL

CROSS-REFERENCE TO PRIOR APPLICATIONS

This application is the U.S. National Phase application under 35 U.S.C. § 371 of International Application No. PCT/EP2017/061843, filed on May 17, 2017, which claims the benefit of European Patent Application No. 16171935.6, filed on May 30, 2016. These applications are hereby incorporated by reference herein.

TECHNICAL FIELD

The present disclosure relates to control of illumination, and particularly but not exclusively to mitigating unwanted or unfavourable responses of certain individuals exposed to dynamic lighting patterns.

BACKGROUND

Lighting effects are commonly used in a large number of application and venues, such as stadiums, concert halls, theatres, arenas, amusement parks, night clubs etc. Such effects play an important part in creating engaging experiences. The lighting effects are very often dynamic, rapidly changing in colour or brightness for example, to create flashing, pulsing or flickering patterns. However, certain lighting effects can cause discomfort or even harm to some individuals, triggering motion sickness or epilepsy for example.

For instance, photosensitive epilepsy occurs in approximately 3 percent of people with epilepsy, and exposure to flashing lights at certain intensities and frequencies, or to certain visual patterns can trigger seizures. Visually induced motion sickness can occur when an individual's eyes see rapid and repeated movement, but the individual's body remains substantially stationary. There have been reports of motion sickness resulting from motion platforms such as flight simulators, and even 3D films have been linked to reports of nausea for example.

SUMMARY

It is desirable for certain people, or groups of people, such as young children and elderly, as well as people with certain sensitivities, to take part in, or attend an event including dynamic lighting effects, while having reduced exposure to such light effects. It is further desirable for all other participants or attendees to experience the full lighting effect without impairment.

Accordingly, in one aspect the present invention there is provided a method of illumination control comprising obtaining information of a dynamic lighting effect having at least one light variation characteristic, said information obtained for at least part of a control area illuminated by said effect; determining, based on the obtained information, a modifying lighting pattern to modify the effect of said dynamic lighting to attenuate at least one said light variation characteristic, and controlling one or more luminaires to output the modifying lighting pattern selectively to only a target portion or portions of said control area.

By using a combination or superposition of light outputs the light effect experienced by certain individuals can be selectively modified based on their location. In this way, lighting is provided which is capable of masking certain parts of a venue from certain light effects or characteristics of those effects, while leaving other areas unaffected. In embodiments therefore, visitors will still be able to enjoy other parts of the experience, such as auditory parts, and some of the lighting effects, whereas other visitors outside of targeted areas will still be able to enjoy the full experience.

In embodiments, the obtained information includes one or more of intensity, frequency, direction, location, or modulation pattern of the dynamic lighting effect. Such information may be based on data received from light sensors, or data relating to lighting control signals used to produce the dynamic effect which it is intended to selectively modify. The obtained information can be analysed to detect or identify one or more light variation characteristics, corresponding to an effect which it is desired to modify. Detecting or identifying can include obtaining parameter values for the characteristic to assist or allow the modifying pattern to be determined.

A light variation characteristic may be frequency and/or amplitude of changes in colour and/or intensity of the dynamic light effect in examples.

Controlling one or more luminaries to output the modifying light pattern includes controlling the location and/or direction of light output in embodiments. The controlling may typically comprise outputting lighting control signals to luminaires. The modifying light pattern may be provided by steered and/or shaped beams of light from luminaires mounted at a distance from the target areas for example. It may alternatively or additionally be provided by one or more luminaires at, or in close proximity to the target portion to be illuminated. Such lighting may be provided at an individual level or at a group or sectional level. In an embodiment, controlling one or more luminaires to output the modifying light pattern includes controlling at least one of the intensity, frequency, direction, location, or modulation pattern of the light output. In one example, the modifying lighting pattern comprises diffuse light.

The modifying lighting pattern may be dynamic in embodiments. In other words, the modifying pattern may vary with time, and may be responsive to information of the dynamic lighting effect as such effect is monitored. This may occur in real time, or may be determined in advance. The modifying pattern for a given point in time can be determined based on information about the dynamic lighting effect at the same point in time, and/or previous points in time, and if data about the dynamic effect is available in advance, possibly future points in time.

The modifying pattern typically does not alter the dynamic lighting effect itself, but acts to attenuate the effect of the dynamic lighting pattern in certain aspects. The combination of the dynamic lighting effect and the modifying pattern preferably reduces a characteristic of light variation rendered or perceived at the target portion or portions, while leaving such characteristic unaffected elsewhere. In embodiments the modifying light reduces the frequency of variation and/or the intensity of variation (modulation depth) perceived at a target portion. As such, the modifying light can cause the overall illumination to be more steady, compared with areas which do not receive modifying illumination.

The location of the target portion may be pre-established in embodiments, or may be determined, by reference to audience data or in response to audience inputs for example. The target portion may be a single continuous area or multiple separate areas, and it may be spatially fixed, or may vary with time.

In a further aspect of the present invention there is provided a lighting control apparatus comprising an input adapted to receive information of a dynamic lighting effect for at least part of a control area illuminated by said effect; a processing module, adapted to determine, based on the received information, a modifying lighting pattern to modify the dynamic lighting effect; and a lighting control module, adapted to output lighting control signals to output the modifying lighting pattern selectively to a target portion of said control area.

In an embodiment, the apparatus further comprises one or more luminaires adapted to receive said control signals and to output said modifying lighting pattern. At least one of said luminaires may be mounted on or integral with a seat.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
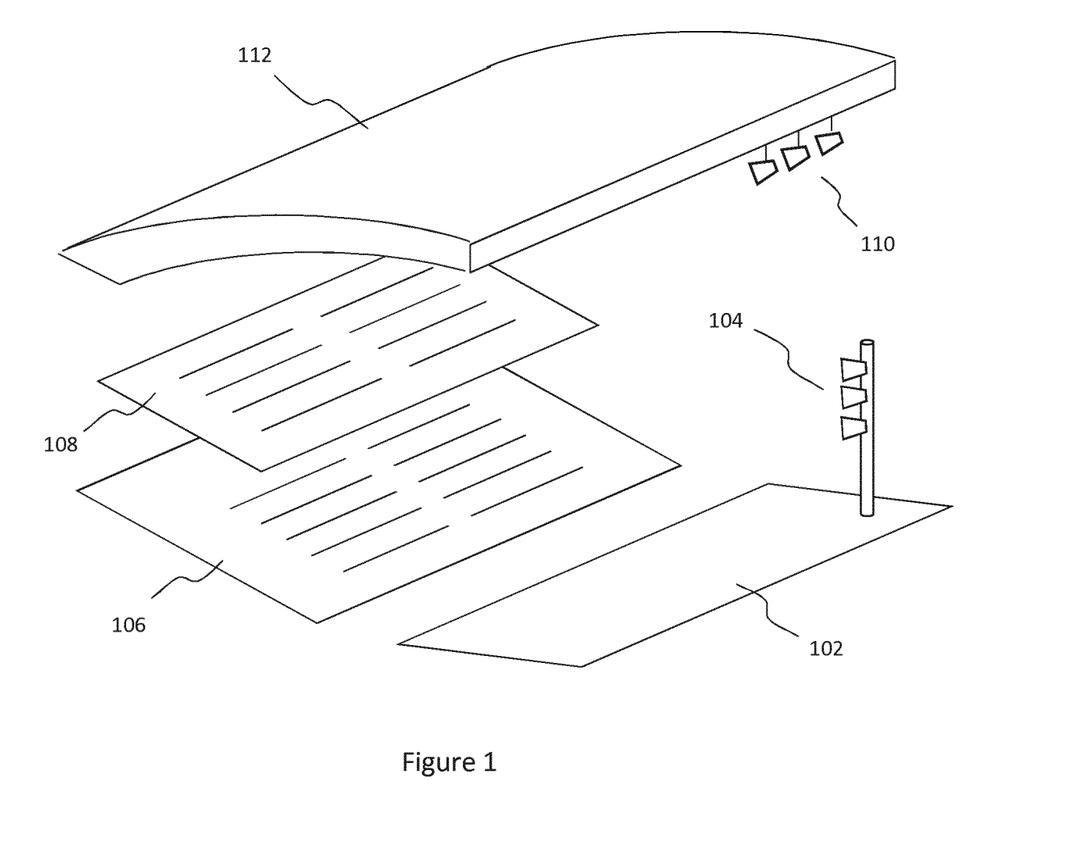
FIG. 1 illustrates lighting for a stage and audience seating.

Referring to FIG. 1, a stage 102 in a concert venue of the like is provided having a lighting rig 104 including a number of luminaires for providing a dynamic lighting effect, for a light show for example. An audience or spectator area is provided in the form of a lower tier 106 and an upper tier 108, which may be provided with seating, or room for standing. The lighting rig 204 may provide illumination or lighting onto the stage, to highlight performers for example, but also provides illumination of some or all of the audience area, possibly through the use of dedicated luminaires directed towards the audience area or areas.

Additional luminaires 110 are provided, directed towards the audience area, in this case mounted to a roof structure 112. In embodiments of the invention, these luminaires 110 are able to output a modifying lighting pattern, to modify a lighting effect output by lighting rig 104.

Figure 2:
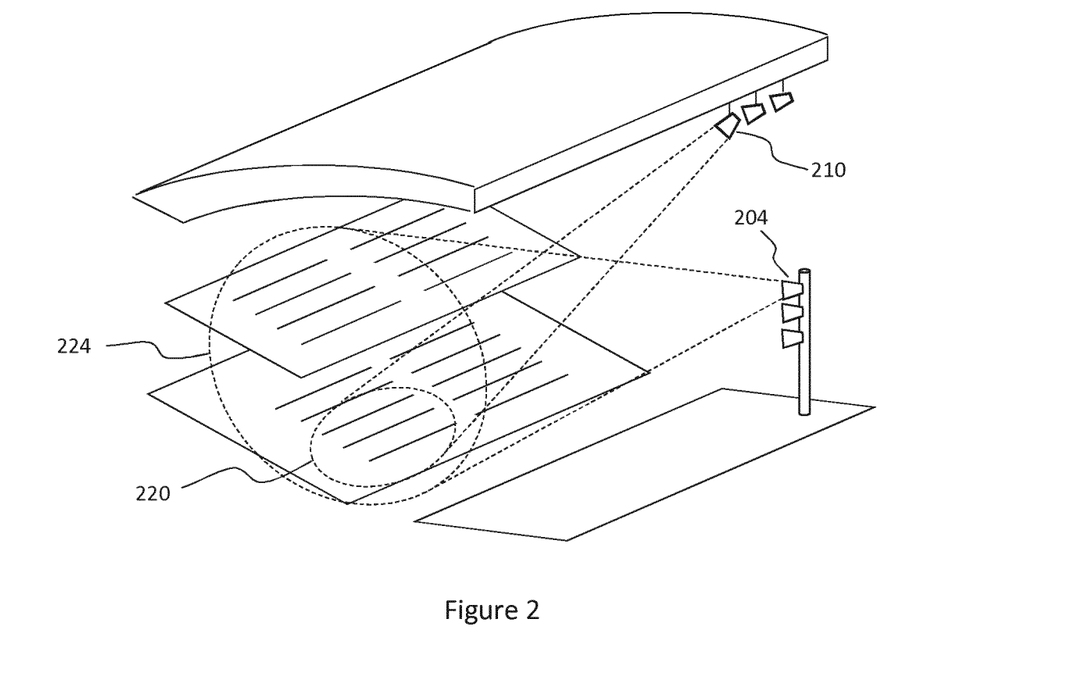
FIGS. 2 and 3 illustrate a lighting effect, and modifying lighting being combined.

In FIG. 2, one of the luminaires 204, which may be part of the lighting rig 104 of FIG. 1 produces an output pattern represented schematically by dashed oval 224. It can be seen that this output pattern extends over a substantial portion of the audience area. This output pattern may correspond to a dynamic lighting effect, such as flashing lighting or stroboscopic lighting for example. Luminaire 210, which may be one of the luminaires 110 of FIG. 1, produces an output pattern represented schematically by dashed oval 220. It can be seen that this output pattern is directed to a smaller area than output pattern 224, and in this example, falls within output pattern 224. This output pattern is preferably modifying lighting and may correspond to diffuse lighting for example. Thus audience members sat or standing within area 220 will experience a combination of light outputs from luminaire 204 and 210. Outside of area 220, but inside of area 224, audience members will experience light output from luminaire 204, but not light output from luminaire 210. In order to delimit light output patterns, the beam output from luminaires can be shaped, for example by using louvres or shutters, such a barn doors or top hats for example. A beam collimator may be used in some embodiments.

As will be explained below in greater detail, the combination of light outputs can be used to selectively modify the light effect experienced by certain individuals based on their location.

In the Example of FIG. 2, the outputs of only two luminaires are illustrated and discussed for simplicity, however larger numbers of light outputs, and light output patterns can be combined in a variety of combinations to achieve desired effects as discussed below.

Figure 3:
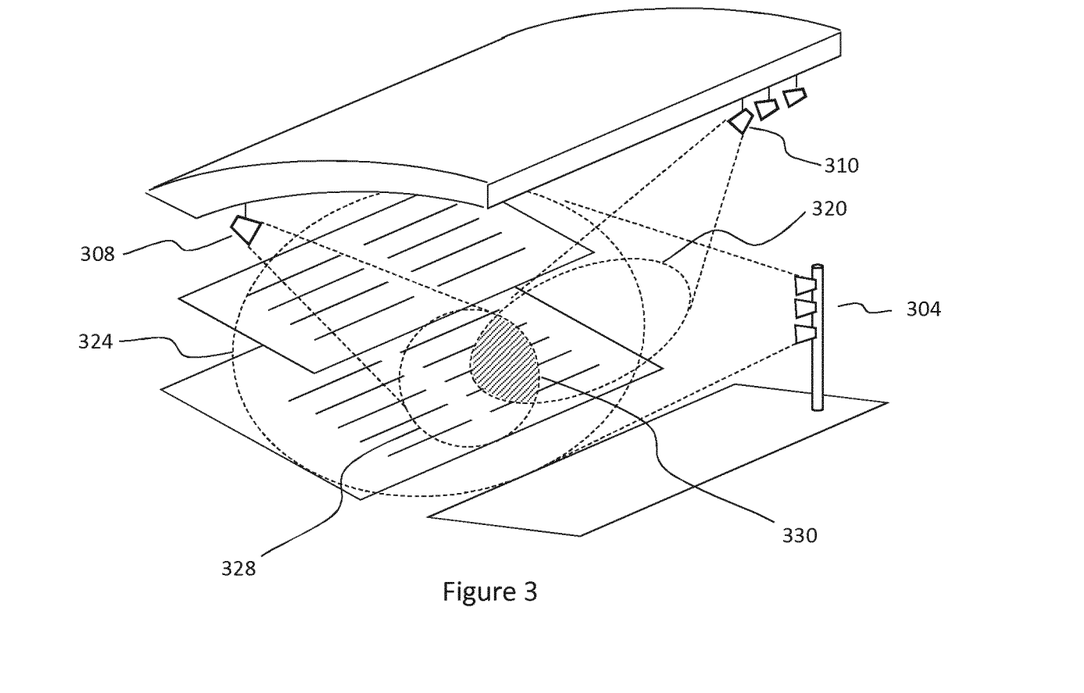

A more complex combination of lighting output patterns is illustrated in FIG. 3.

An output pattern represented schematically by dashed oval 324 represents the collective output of one or more luminaires or groups of luminaires 304, which may be part of the lighting rig 104 of FIG. 1. Although luminaires 304 are shown mounted together, in FIG. 3, output pattern 324 could be created by multiple luminaires mounted at different locations, for example at both sides of or above a stage, or mounted to the ceiling of a roof structure, and generally oriented towards the audience area. This output pattern extends over a substantial area, and may extend over all of the audience area, and typically corresponds to a dynamic lighting effect, such as flashing lighting or stroboscopic lighting for example.

Luminaire 310, which may be one of the luminaires 110 of FIG. 1 for outputting modifying lighting, produces an output pattern represented schematically by dashed oval 320. It can be seen that this output pattern falls partially overlapping output pattern 324.

Luminaire 308, is positioned separately from luminaire 310, and faces in a different direction, but is still directed generally towards an audience or spectator area. Luminaire 308 produces an output pattern represented schematically by dashed oval 328. It can be seen that this output pattern falls within pattern 324, and partially overlapping within output pattern 320.

Luminaires 308 and 310 may output diffuse lighting for example. Such diffuse lighting modifies the dynamic lighting effect of pattern 324 in this example.

It can be seen that shaded area 330 falls within pattern 320 and 328 (and 324), and in embodiments it is this combination of light from luminaires 308 and 310 that provides a perceivable modifying effect to the light effect from luminaires 304, while a modifying effect is not perceptible if light from only one of luminaires 308 and 310 is received. Such an embodiment may be advantageous to tailor the area of perceived modification more precisely. Alternatively, the degree of the modification experienced can be varied, with a greater degree of perceived modification being experienced in area overlap area 330, than in either of areas 320 or 328 alone. As a further possibility, area 320 may be modified from one effect type, say a flashing effect above a certain frequency, while area 328 may be modified for a second, different effect type such as a change of brightness above a certain threshold. Area 330 may be modified for both types.

The arrangements shown in FIGS. 1 to 3 generally illustrate the concept of a dynamic lighting effect, which is typically part of a light show or stage effect, illuminating a large part, or substantially all of the audience or audience area—it is usually desired for all of the audience to experience the effect. These figures also show a modifying lighting pattern being used to selectively illuminate one or more 'target' portions or subsections of the area illuminated by the dynamic lighting effect. This selective illumination is used to modify or reduce the intensity or degree of dynamic lighting rendered for spectators or audience members located in those areas. Desirably the modifying lighting affects the target areas only, and does not affect or 'leak' to those in proximity to or neighbouring the target areas, so that the full dynamic lighting effect is experienced outside of the target areas.

In the above examples, the selective illumination is directional lighting, provided by steered and shaped beams of light from luminaires mounted at a distance from the target areas. Such lighting is particularly suited for providing illumination at a sectional level, e.g. specified rows or groups of seats. Additionally or alternatively, selective, modifying, illumination can be provided by one or more luminaires at, or in close proximity to the target area.

Figure 4:
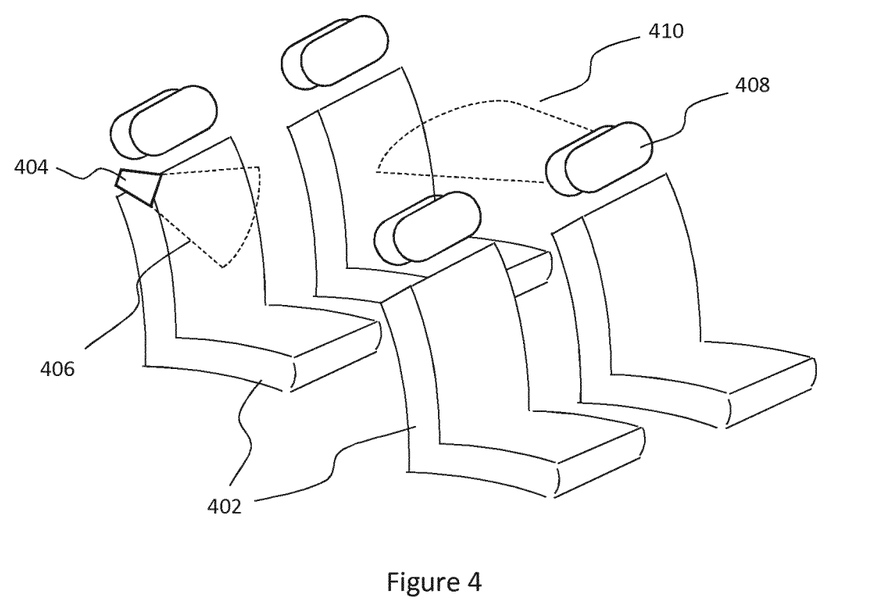
FIG. 4 shows luminaires in and around a seating area.

FIG. 4 shows a group of seats 402 such as those in a theatre or sports stadium for example. A luminaire 404 is mounted to or integrated into one of the seats, and provides a light output indicated by dashed arc 406, to the occupant of the seat. A luminaire (not shown) can also be included in the back or headrest 408 of a seat, providing a light output 410 to the occupant of the seat directly behind. In this way, modifying lighting can be provided at to a single person, or possibly to a small group (e.g. 2 or 3 people). Such lighting is particularly suited for providing illumination at an individual level, e.g. individual specified seats.

Figure 5:
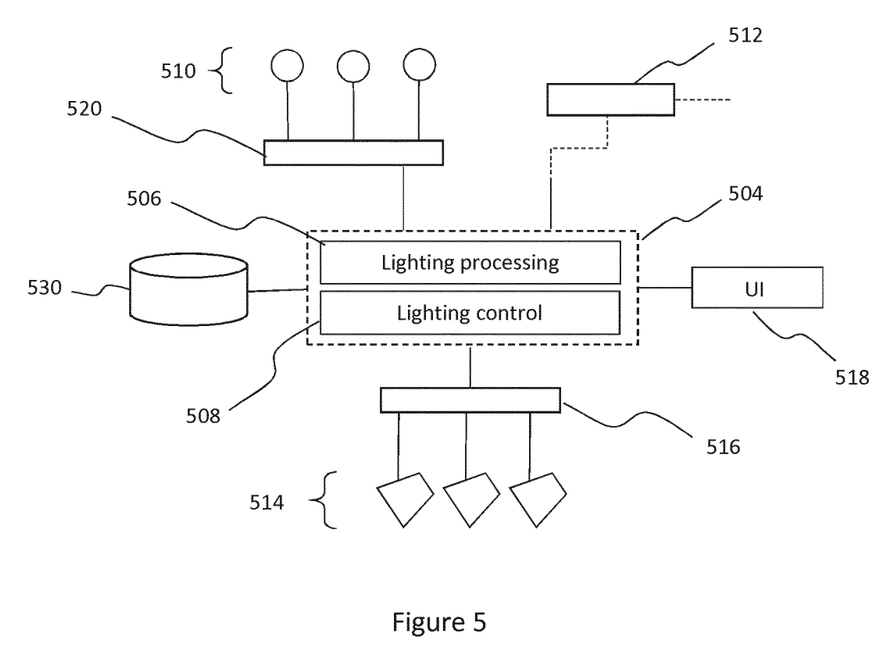
FIG. 5 is a functional representation of a lighting control system.

FIG. 5 is a functional schematic and shows an example of a lighting control system including a processor 504 (comprising one or more processing units at one or more locations), arranged to run code implementing a lighting processing module 506 and a lighting control module 508. E.g. the processor 504 may be implemented in a single device such as a centralized lighting control unit or general purpose computer terminal, or in a server comprising one or more server units at one or more geographical sites, or even as a distributed function distributed amongst some or all of the luminaires 110, 204, 210, 304, 308, 310, 404. The lighting control system of FIG. 5 may be configured to perform some or all of the method of FIG. 7 as will be described below.

The processor 504 is arranged to receive an input from an array of light sensors 510 for sensing the lighting in at least part of a monitored or control area, which is typically an audience area such as a stadium stand, or concert hall seating area, such as the areas 106 and 108 of FIG. 1 for example. The processor 504 may be arrange to receive this input received via any wired or wireless connection or network, using any suitable protocol. Individual light sensing elements of the sensors 540 could comprise photodiodes or photoresistors for example, or possibly a CCD or CMOS sensor, and are typically arranged together with control electronics on a chip for example. Here multiple individual light sensors are shown, with each sensor able to be placed at a separate location to provide sensor coverage over an area. Equally multiple such arrays can be provided to cover different spatial areas. For example, one sensor could be provided on or at every seat in an auditorium, with sensors for a given row connected in a single array, and multiple arrays provided corresponding to multiple rows of seats. More sparse distribution of sensors may be sufficient in other examples. While each sensor could be connected directly to processor 504, it is more convenient for the sensors to feed into a pre-processor 520, which may function as a multiplexer for example, which in turn provides the input to processor 504. One or more pre-processors can be cascaded in the case of multiple arrays for example.

Sensors, or groups of sensor are separately addressable in embodiments, to allow the spatial variation of lighting to be determined. The spatial accuracy or resolution in embodiments may be for a section or group of the audience, for example in a given seating row, or possibly even specific individual seats.

Additionally or alternatively, information about the lighting effect being rendered in an area can be provided from communication module 512, and input to processor 504. In this way, communication module 512 can receive control signals for luminaires such as 204 and 304 of FIGS. 2 and 3 for example. This may again be via any suitable wired or wireless network, using any suitable protocol such as DALI or DMX for example. Based on the control signals, and the known characteristics and positions of the luminaires to which they are addressed, the local lighting effect at a given location in an audience area can be calculated or estimated. If lighting plans or light plots are available, for example from lighting design software, these can be accessed and input via the module 512. In one example, communication module 412 could be a node in a lighting network, connected to a master node, such as a lighting console. Alternatively, module 512 could be connected to a local area network LAN or the internet, in order to receive information about a lighting effect.

A model of the audience or spectator areas (i.e. the areas or areas to be monitored) may be used to simulate the lighting effects experienced by those areas. For example a 3D model of a venue can be used together with information about the lighting arrangements and control signals to model the light output rendered at a location. Visualisation or simulation software such as Realizzer® can provide photorealistic simulated views of a lighting effect or a combination of effects, from any given audience position for example. A 3D model of the venue can be obtained via communication module 512 and/or may be stored in optional memory or storage device 530.

Sensors 510 and/or communication module 512 provide information about the lighting effect being rendered in an area to be monitored. For example, information on light intensity, frequency (colour), modulation pattern, and frequency of modulation can be provided or ascertained. The information provided can also indicate spatial distribution and/or location. For a given type or classification of lighting effect therefore, the extent and location of the area experiencing that effect can be determined. It is also possible to monitor a given area, and to identify one or more types of classifications of effect in that area, to create a 'heat map' of different effects, or the presence or absence of different effects.

The area monitored may correspond to substantially the whole area illuminated by the lighting effect, or to a sub-section or sub-sections of that area. For example a whole audience seating area, or stand or tier of an audience seating area could be monitored, or just a designated section of seating, such as a section designated to be child friendly, or suitable for those with a condition such as epilepsy.

The information received from sensors 510 or module 512 can be provided substantially in real time. In some cases, the information can be obtained in advance, such as where a light show has been designed and stored as a series of lighting instructions, or a lighting script.

Based on the received information, light processing module 506 is able to analyse lighting effects in the designated area, and calculate an appropriate modifying lighting pattern or response, if appropriate. Such analysis and calculation are explained in more detail below with reference to FIGS. 6 to 8.

Figure 6:
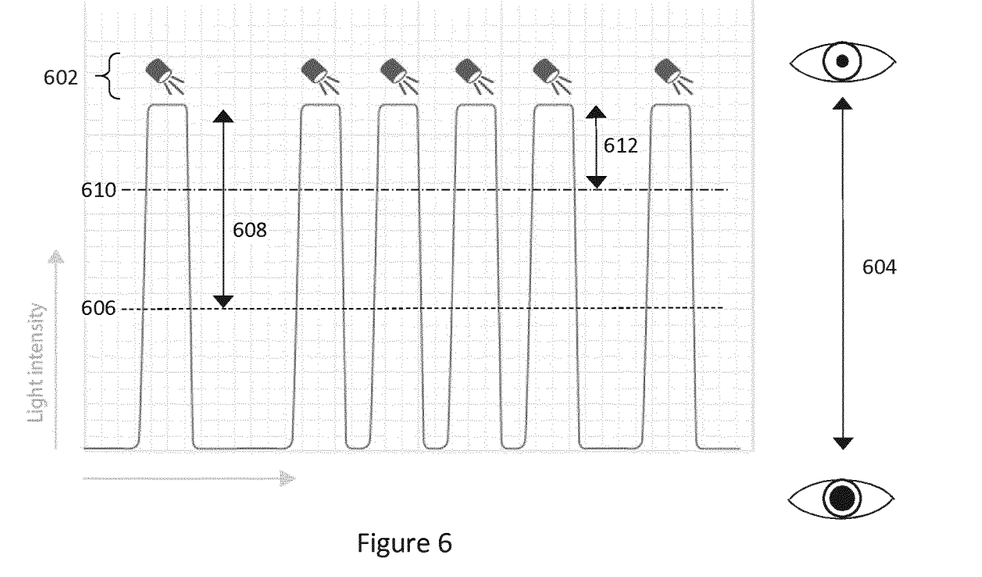
FIG. 6 is a graph illustrating lighting effects.

FIG. 6 is a graph illustrating a dynamic lighting effect, with light intensity plotted against time. As can be seen, the lighting intensity varies substantially as one or more luminaires turn on and off in a pulsing pattern, indicated schematically by symbols 602. The human eye is responsive to such changes in intensity, and a change from very bright, to almost complete darkness, as shown by arrow 604 causes pupils of an individual subject to such lighting effect to constrict and dilate as shown. This change of lighting, particularly at certain frequencies, can cause discomfort to some individuals, and could even trigger motion sickness or epilepsy for example.

By providing a 'base' lighting level which is non-zero however, the modulation depth of intensity of the lighting effect shown in FIG. 6 can effectively be reduced. That is, the change in brightness or intensity perceived by the user's eye is lessened. For example, if a base lighting level as indicated by dashed line 606 is provided in the relevant location, the change in intensity indicated by arrow 608 is perceived. This causes a reduced effort on the human eye, and can reduce the likelihood of adverse effects and/or discomfort.

If a higher level of base illumination is provided, such as indicated by dashed line 610, then the perceived change in brightness is further reduced, as indicated by 612.

The example of intensity, and reducing the change of intensity has been used above, however different factors and combinations of factors can be taken into account, depending on the dynamic pattern and the characteristic or characteristics which it is desired to mitigate, as will be explained in greater detail below with reference to FIG. 8.

Returning to FIG. 5, based on the output of light processing module 506, lighting control module 508 sets lighting control parameters for luminaires 514 (which may be luminaires such as 210, 308, 404 of FIGS. 2-4) to control output of modifying lighting to the appropriate areas. The control parameters can be output directly to the luminaires, or can be output to an intermediate controller 516, which may act as a multiplexer and/or an access point to a lighting network for example. The control parameters may specify light and light effects such as intensity, frequency (colour), modulation pattern, and frequency of modulation. The control parameters may also specify spatial information such as location or direction, e.g. by specifying a particular luminaire or group of luminaires such as luminaire 404 of FIG. 4, or specifying a luminaire such as 308 of FIG. 3, and specifying pan and tilt values, and beam width.

The apparatus optionally includes a memory or storage device 530, which may be connected to or integrated with processor 504, or may be remotely accessed via a network, such as the internet for example. The apparatus also optionally includes a user interface 518 for presenting a user with information and prompts, and receiving instructions from a user.

Figure 7:
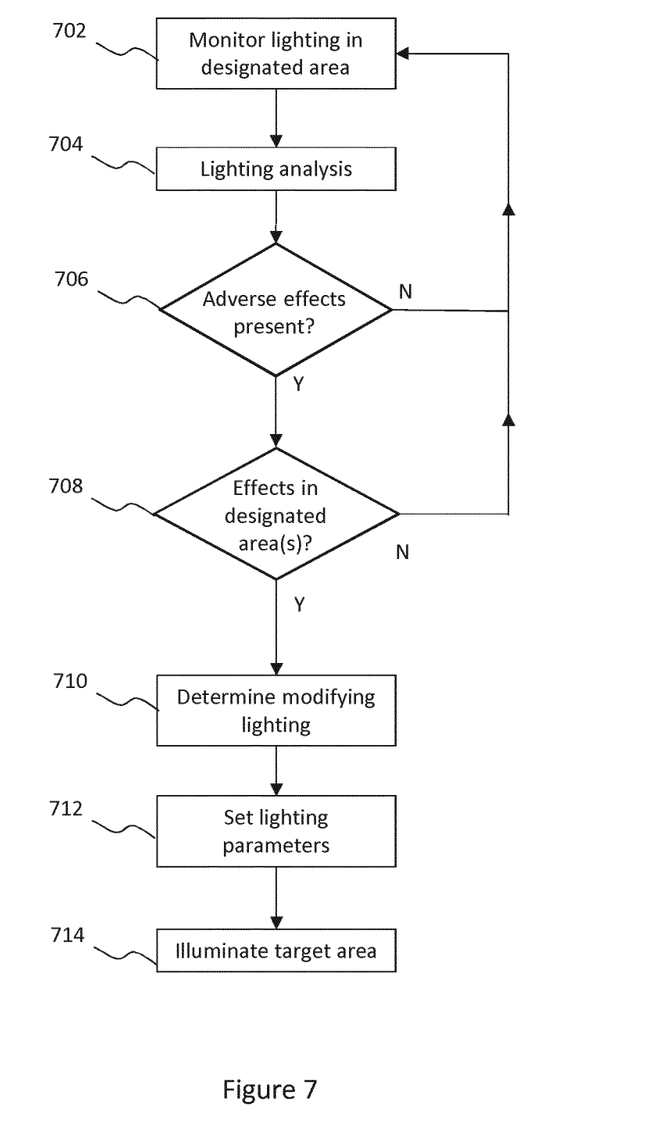
FIG. 7 is a flow diagram illustrating a method of lighting control.

FIG. 7 is a flow diagram illustrating an example method of lighting control, which method may be performed by the apparatus of FIG. 5 for example.

At step 702, lighting in a control area is monitored to detect dynamic lighting effects of interest. This could be for example by obtaining information from light sensors 510 or from communication module 512 of FIG. 5 for example. The area monitored may correspond to substantially the whole area illuminated by the lighting effect, or to a sub-section or sub-sections of that area.

At step 704, the detected lighting is analysed and at step 706 it is determined whether adverse or unfavourable lighting effects, such as effects which might cause discomfort or seizure in certain individuals, are present. What is considered unfavourable may vary in different embodiments, and for different individuals, and substantially any effect can be deemed to be unfavourable.

Such lighting effects are typically dynamic lighting effects and may be defined by in terms of values for certain light variation characteristics. For example, a rate of change of intensity or colour, and/or magnitude of changes in intensity or colour can be determined. Values for such characteristics can be compared to one or more thresholds, either individually, or in combination, to determine whether such lighting may be considered adverse or unfavourable. The directionality of the light may be taken into account also, and in some examples, a constant intensity beam changing direction can cause variations in intensity at a sensed location, giving rise to a light variation characteristic. Lighting having a certain frequency or frequency range of modulation, is another example. Such conditions can be combined with other parameters such as maximum or average intensity, or colour/hue. These conditions may be known from test data or other reference sources, and stored in advance (for example in memory 530).

Analysis may therefore extract such parameters from monitored lighting and compare them to predetermined conditions to determine whether modifying lighting is required or appropriate. Determining unfavourable effects can be performed based on instantaneous values such as absolute brightness or intensity, or can be based on a sliding temporal window, which may be better suited to dynamic effects.

If such potentially adverse or unfavourable effects are determined (Yes at step 704) then it is assessed in step 708 whether the adverse or unfavourable lighting effects are present in one or more designated areas. If potential adverse effects are not determined (No at step 704) then no further action is taken and the process returns to monitoring at step 702. A designated area can be a subset or sub-portion of the area being monitored.

A designated area can be associated with characteristics of audience members or spectators. For example an area may be pre-designated for accommodating the very young, or elderly. Alternatively characteristics of audience members or spectators, having freely booked or selected seats could be used to determine a designated area or areas, which may change from performance to performance. This may be performed using information available from a booking system for example, or information provided individuals in situ, for example via a user interface in or connected to a seat, or via a smartphone for example. In certain embodiments therefore, an audience member can indicate in real time if they would like lighting to be mitigated (or further mitigated or less mitigated) for them. In this way, if a section of an arena or auditorium being monitored comprises tens or hundreds of seats, a designated area might be a particular row of seating, or a part of a particular row, or even a single seat in some cases.

In some embodiments, only the designated area is monitored for unfavourable lighting conditions. In such a case, step 708 can be omitted.

As noted above, information concerning the monitored lighting indicates spatial distribution and/or location in embodiments. In step 708 then, information about the location and extent of the lighting effect or effects which has been determined to be unfavourable in step 706 is compared to the designated area or areas. The extent of a lighting effect may be difficult to determine exactly and so a threshold value applied to a criteria may be used. This threshold may be different from the threshold used to determine adverse effects in step 706, to add an extra margin of error for example, or to allow different thresholds for different locations or areas. In an example, if any designated area experiences the adverse or unwanted lighting effect to an extent above the relevant threshold, a positive determination results.

In the case of a positive determination (Yes at step 708) a modifying lighting pattern is determined at step 710. In the case of a negative determination (No at step 708) then no further action is taken and the process returns to monitoring at step 702.

The modifying lighting pattern is designed to mitigate or attenuate one or more light variation characteristics in embodiments. In the case of a pulsing light for example, the modifying lighting pattern is designed to 'smooth' or 'fill in' the variation in intensity to some extent to provide a smoothed lighting effect. An example of such a lighting pattern is diffuse lighting, used as per the example of FIG. 6.

The modifying lighting pattern may derive from modelling the spectral response of the human eye to various photometric quantities, and using the model to predict or estimate the response to various stimuli. Additionally or alternatively, lighting effects known to mitigate certain characteristics, or even certain known unfavourable lighting effects may be known in advance (for example based on test data). Known lighting effects or characteristics deemed to be unfavourable, and corresponding mitigating lighting pattern can be stored in memory 530 of FIG. 5 for example.

It will be understood that different mitigating or modifying light patterns can be produced to mitigate unwanted or unfavourable dynamic lighting effects, to different degrees. The modifying lighting pattern can be determined based on an analysis of the dynamic lighting effect in question. For example, overall patterns or statistical measures, such as mean brightness, or maximum modulation frequency of the dynamic lighting effect can be obtained for a time window, and a modifying pattern determined based on such information. More detailed analysis can also be performed, to monitor the waveform of the dynamic effect, and produce a modifying pattern which responds, or takes into account this waveform in real time. Lighting simulation or modelling software, as discussed above, may be used together with a 3D model of a venue to assist in determining a modifying lighting pattern.

Figure 8:
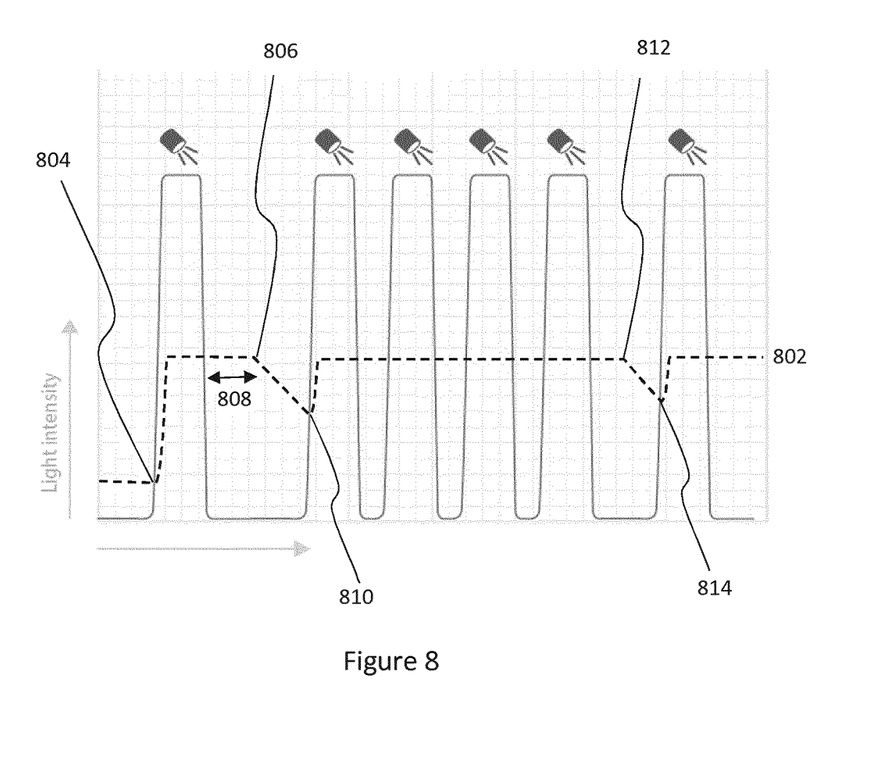
FIG. 8 is a graph illustrating lighting effects.

Considering FIG. 8, a dynamic lighting effect is illustrated in a similar fashion to FIG. 6, with light intensity plotted against time. A modifying lighting pattern, in the form of a base illumination level 802 is shown. The modifying lighting pattern varies dynamically in response to the changes in the dynamic effect it is intended to modify. Initially the base illumination level is low, but at point 804 the sudden increase in illumination caused by, say, a spotlight turning on is detected, and the background illumination level rises to a preset level. The spotlight subsequently turns off rapidly, and at a point 806, a short delay period 808 after the sudden reduction in light, the background illumination level is gradually reduced. At point 810, a rise in illumination caused the spotlight turning on is again detected, and the base illumination again rises to the preset level in response. The base illumination level remains at this level until point 812, even though the spotlight cycles through a number of on/off phases, as the level is only reduced only after a delay period since a reduction in detected light level. At 814, the base illumination level rises again, in a similar fashion to point 810.

By dynamically tailoring the modifying light pattern in this way, the modifying light is less noticeable, and less of a distraction or nuisance, while maintaining the ability to reduce potential adverse effects experiences by certain individuals.

As can be seen in this example, the modifying light pattern can be created by a set of rules in response to instantaneous values of lighting rendered in the target area. In this example, the mitigating lighting is switched to a preset value if the intensity of detected light rises above a certain value, and/or at a certain rate. The mitigation lighting is ramped down if the intensity of detected light remains below a threshold value for a predetermined period of time.

In an example where the dynamic lighting effect which it is desired to mitigate is known in advance, eg where it is a sequenced light show having a lighting script, a mitigating lighting pattern can be created in advance, and stored for example in memory 530. Such a mitigating lighting pattern can pre-empt lighting conditions, and take into account upcoming changes in the dynamic lighting effect.

In step 712, lighting parameters are determined for effecting the modifying lighting pattern or patterns determined in step 710. The lighting parameters may specify light and light effects such as intensity, frequency (colour), modulation pattern, and frequency of modulation. The control parameters may also specify spatial information such as location or direction of light desired.

As already noted, the modifying lighting is directional, or location specific in embodiments, and may be provided at a sectional level or at an individual level. It is desirable for the modifying lighting to be output only to a target portion of the area illuminated by the dynamic effect. One luminaire or a plurality of luminaries in combination can be used to provide a mitigating effect, such as a combination of lighting substantially at the target location (e.g. lighting shown in FIG. 4) and lighting at a distance (e.g. lighting shown in FIGS. 2 and 3) and in some cases a desired mitigating effect can be provided by more than one combination. Parameters may therefore select luminaires and combinations of luminaires, and the direction and/or location of those luminaires. Different options for providing the same, or equivalent mitigating lighting, may be evaluated based on factors such as lighting required immediately previously or subsequently, or conditions or factors associated with areas adjacent to the target area.

Finally, at step 714, the target area is illuminated according to the parameters set in step 712.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure including the light processing module 506 lighting control module 508—may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. The described processor 504 may also be implemented as a one or a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of illumination control for masking target portions of a control area of a venue from certain characteristics of a dynamic lighting effect that is part of a light show or a stage effect, the method comprising:
    obtaining information of the dynamic lighting effect having at least one light variation characteristic comprising at least a light level intensity change associated with a production of a stroboscopic lighting effect, said information obtained for a target portion of the control area illuminated by said dynamic lighting effect, wherein the target portion of the control area is determined based on audience data or audience inputs;
    analysing said obtained information to identify one or more light variation characteristics comprising at least the light level intensity change associated with the production of the stroboscopic lighting effect;
    determining, based on the identified one or more light variation characteristics, a modifying lighting pattern; and
    controlling one or more luminaires to output the modifying lighting pattern selectively to said target portion of the control area, such that said target portion of the control area is thus illuminated by a combination or superposition of the dynamic lighting effect and the modifying lighting effect, thereby reducing at least one of the identified one or more light variation characteristics, comprising at least a reduction in light level intensity change, rendered or perceived at said target portion of the control area, while leaving the identified one or more light variation characteristics of the dynamic lighting effect unaffected outside of the target portion of the control area.

2. A method according to claim 1, wherein the obtained information further includes at least one of frequency, direction, location, or modulation pattern.

3. A method according to claim 1, wherein controlling one or more luminaires to output the modifying light pattern includes controlling the direction and/or location of light output.

4. A method according to claim 1 wherein controlling one or more luminaires to output the modifying light pattern includes controlling at least one of the intensity, frequency, or modulation pattern of the light output.

5. A method according to claim 1, wherein obtaining information comprises using a light sensor or wherein obtaining information comprises receiving lighting control signals.

6. A method according to claim 1, wherein the modifying lighting pattern is dynamic.

7. A method according to claim 1, wherein the modifying lighting pattern is determined in real time.

8. A method according to claim 1, wherein the modifying lighting pattern comprises diffuse light.

9. A non-transitory computer readable medium comprising computer program code which, when executed on one or more processors, causes the one or more processors to perform the method of claim 1.

10. A lighting control apparatus for masking target portions of a control area of a venue from certain characteristics of a dynamic lighting effect that is part of a light show or a stage effect, the lighting control apparatus comprising:
    an input adapted to receive information of the dynamic lighting effect having at least one light variation characteristic comprising at least a light level intensity change associated with a production of a stroboscopic lighting effect, said information being received for a target portion of the control area illuminated by said effect, wherein the target portion of the control area is determined based on audience data or audience inputs;
    a light processing module, adapted to:
    analyse said obtained information to identify one or more light variation characteristics comprising at least the light level intensity change associated with the production of the stroboscopic lighting effect; and
    determine, based on the identified one or more light variation characteristics, a modifying lighting pattern; and
    a lighting control module, adapted to:
    output lighting control signals to one or more luminaires in order for the one or more luminaires to output the modifying lighting pattern selectively to said target portion of the control area such that said target portion of the control area is thus illuminated by a combination or superposition of the dynamic lighting effect and the modifying lighting effect, thereby reducing at least one of the identified one or more light variation characteristics, comprising at least a reduction in light level intensity change, rendered or perceived at said target portion of the control area, while leaving the identified one or more light variation characteristics of the dynamic lighting effect unaffected outside of the target portion of the control area.

11. An apparatus according to claim 10, further comprising the one or more luminaires adapted to receive said control signals and to output said modifying lighting pattern.

12. A method of illumination control for masking target portions of a control area of a venue from certain characteristics of a dynamic lighting effect that is part of a light show or a stage effect, the method comprising:

obtaining information of the dynamic lighting effect having at least one light variation characteristic comprising at least a light level intensity change, said information obtained for a first target portion and a second target portion of the control area illuminated by said dynamic lighting effect, wherein the first target portion and the second target portion of the control area are determined based on audience data or audience inputs;

analysing said obtained information to identify one or more light variation characteristics comprising at least the light level intensity change;

determining, based on the identified one or more light variation characteristics, a first modifying lighting pattern and a second modifying light pattern wherein the second modifying light pattern is different than the first; and controlling a first luminaire to output the first modifying lighting pattern selectively to a first target portion of the control area and controlling a second luminaire to output the second modifying lighting pattern selectively to a second target portion of the control area, such that said first target portion and said second target portion of the control area are illuminated by a combination or superposition of the dynamic lighting effect and the first modifying lighting effect and a combination or superposition of the dynamic lighting effect and the second modifying lighting effect, respectively, thereby reducing at least one of the identified one or more light variation characteristics, comprising at least a reduction in light level intensity change, rendered or perceived at said first target portion of the control area and second target portion of the control area, while leaving the identified one or more light variation characteristics of the dynamic lighting effect unaffected outside of the first target portion and the second target option of the control area.

* * * * *